United States Patent
Kann

(10) Patent No.: US 11,965,320 B2
(45) Date of Patent: Apr. 23, 2024

(54) GRANULAR CONTROL OF WATER DISTRIBUTION SYSTEM PRESSURE

(71) Applicant: Itron, Inc., Liberty Lake, WA (US)

(72) Inventor: James Lee Kann, Mica, WA (US)

(73) Assignee: ITRON, INC., Liberty Lake, WA (US)

(*) Notice: Subject to any disclaimer, the term of this patent is extended or adjusted under 35 U.S.C. 154(b) by 294 days.

(21) Appl. No.: 17/209,028

(22) Filed: Mar. 22, 2021

(65) Prior Publication Data

US 2022/0298760 A1    Sep. 22, 2022

(51) Int. Cl.
| | |
|---|---|
| E03B 7/07 | (2006.01) |
| E03B 7/02 | (2006.01) |
| G05B 15/02 | (2006.01) |
| G05D 16/20 | (2006.01) |

(52) U.S. Cl.
CPC ........... E03B 7/075 (2013.01); E03B 7/02 (2013.01); G05B 15/02 (2013.01); G05D 16/204 (2013.01)

(58) Field of Classification Search
CPC ... E03B 7/075; E03B 7/02; E03B 1/02; G05B 15/02; G05D 16/204; G05D 7/0641; G06Q 10/0631; G06Q 50/06
See application file for complete search history.

(56) References Cited

U.S. PATENT DOCUMENTS

| | | | |
|---|---|---|---|
| 2011/0178644 A1* | 7/2011 | Picton | E03B 7/071 700/282 |
| 2018/0116483 A1 | 5/2018 | Glass | |

FOREIGN PATENT DOCUMENTS

| | | |
|---|---|---|
| CN | 104061685 | 9/2014 |
| CN | 112128629 | 12/2020 |
| EP | 3620723 | 3/2020 |

OTHER PUBLICATIONS

I2O Solution oNet brochure; Oct. 23, 2017; 2 pages.
PCT International Preliminary Report on Patentability mailed Oct. 5, 2023 for PCT Application No. PCT/US21/64447, 7 pages.
International Search Report and Written Opinion for PCT Application No. PCT/US21/64447, mailed Mar. 24, 2022, 12 pages.
i20 Solution oNet brochure; Oct. 23, 2017; 2 pages.

* cited by examiner

*Primary Examiner* — Charles R Kasenge
(74) *Attorney, Agent, or Firm* — Lee & Hayes P.C.

(57) ABSTRACT

Techniques for controlling water pressure at a plurality of water customer service sites are described. In an example, a first plurality of water service sites having water pressure values greater than a first threshold value are identified. A second plurality of water service sites having pressure values less than a second threshold value are identified. Valves controlling water flow to respective customer service sites within the first and second pluralities of water service sites are adjusted. The adjustments increase water pressure in the second plurality of water service sites to a pressure above a minimal target pressure. The adjustment maintains the water pressure of the first plurality of service sites above the minimal target pressure. In an example, groups of water service sites are associated with respective water mains and/or water pressure sensors. Information shared between groups may assist in adjusting water valves within the water system.

20 Claims, 11 Drawing Sheets

GRANULAR CONTROL OF WATER DISTRIBUTION SYSTEM PRESSURE

BACKGROUND

Water utility distribution systems may serve thousands or millions of customer service sites. In many water systems, water pressure may vary by 20 psi during a day due to variations in the rates of water usage and water supply. Also, in many water systems, water pressure differences may result from differences in pipe sizes, lengths of pipe runs, and/or numbers of pipe bends. Water pressure may be set higher at upstream locations, so that the pressure does not fall below a lower threshold at downstream service points. The variability of water pressure within the system can cause several problems. A first problem is pipe fatigue and failure, especially at joints and bends. A second problem is increased water loss at leakage points if pressure is higher than required to meet demand. A third problem is increased complexity in hydraulic modeling of the system, which makes system predictions, control of systems operation, and/or attainment of desired outcomes more difficult. A fourth problem is that water pressure may be too low at some service sites and/or regions, even while other service sites and/or regions within the same system have more than adequate pressure values.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Systems, methods and techniques may be used to control and/or change water pressure at a plurality of water customer service sites. The techniques may be employed by a commercial or municipal water utility company. In an example, a water system may be configured with a plurality of pressure sensors. The pressure sensors may be located at intervals along water mains, at customer service sites, at pumping stations, at reservoirs, and/or at other locations. If a customer service site does not have a water pressure sensor, its water pressure may be estimated, such as by using a water pressure sensor of a water main to which it is connected or that is in the vicinity. In the example, a first plurality of water service sites having water pressure values greater than a first threshold pressure value are identified. The first threshold water pressure value may be somewhat dependent on the water system itself, but is, or exceeds, a minimal required, expected, and/or specified pressure. A second plurality of water service sites having pressure values less than a second threshold water pressure are identified. Valves controlling water flow to respective customer service sites within the first and second pluralities of water service sites are adjusted. The adjustment restricts water flow and lowers water pressure at the first plurality of service sites, but maintains the water pressure above a minimal target pressure. The adjustment more fully opens water valves to increase water pressure at the second plurality of water service sites, increasing pressure above the minimal target pressure. Accordingly, while water pressure was lowered at one group of customer sites, it is still above the minimal target value. Additionally, the customer sites previously experiencing pressure that was too low, have been raised above the minimal target value.

In a further example, groups of water service sites are defined, e.g., associated with respective water mains, respective geographic elevation, and/or respective water pressure sensors. Information may be shared between groups, and distributed processing may assist in adjusting water valves within the water system. In still further examples, information regarding water pressure, valve settings, water demand, etc., may be centrally located, and decisions regarding a degree to which valves are opened or closed may be made at the central processing location.

Example Systems and Techniques

Figure 1:
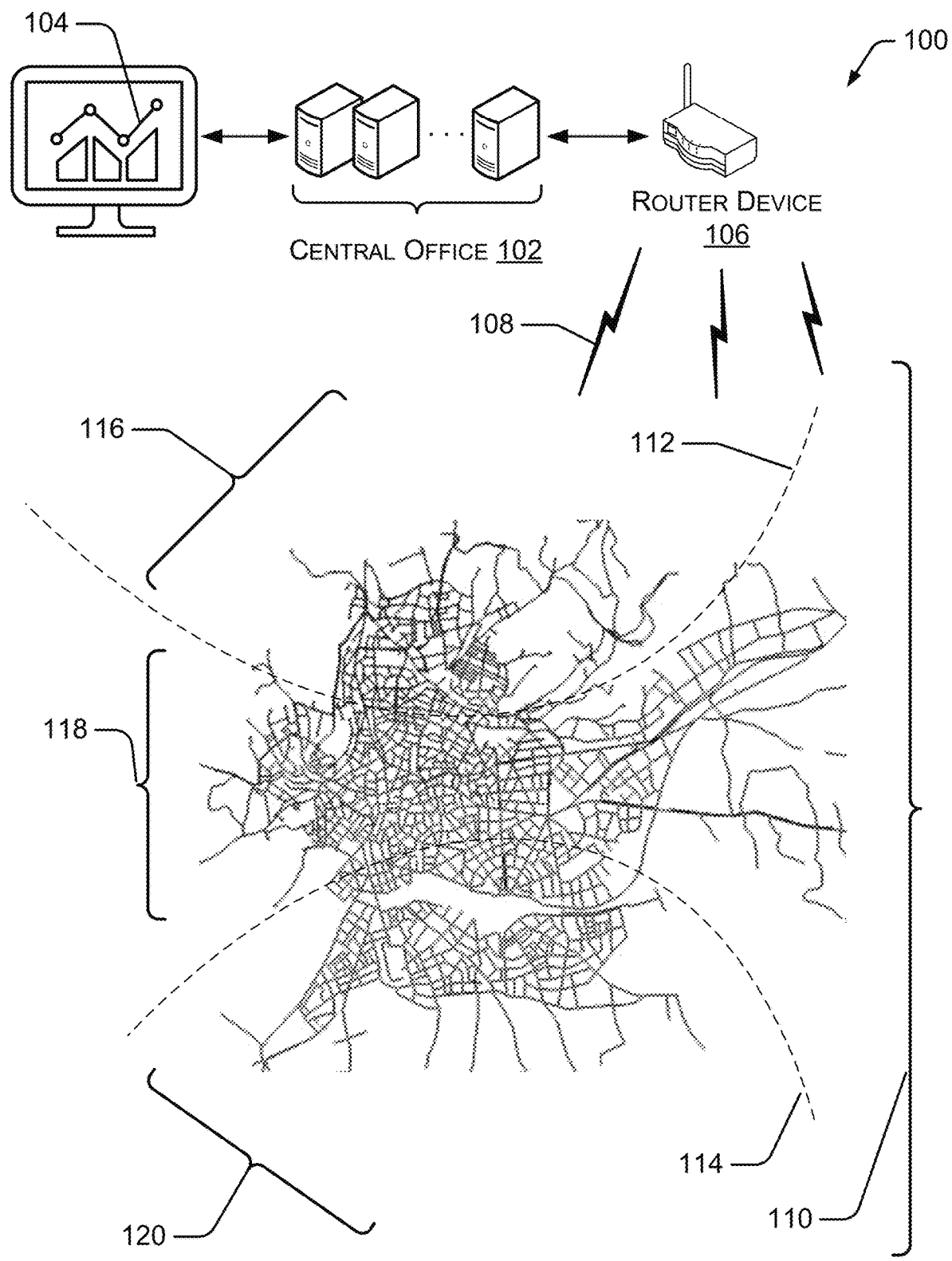
FIG. 1 is a block diagram showing an example water supply system, illustrating devices, arrangements of devices and/or techniques for controlling and/or changing water pressure at a plurality of water customer service sites.

FIG. 1 shows an example water supply system 100, illustrating devices, arrangements and/or techniques for controlling and/or changing water pressure at a plurality of water customer service sites. In the example system 100, a central office server 102 is a computing device configured to implement some of the techniques discussed herein. A user interface 104 is presented by the central office server 102, and may include representations of the water system, including water mains, water pressure sensors, water valves, customer sites, data concerning water supply, pressure, consumption, etc. A router device 106 is a generalized representation of a communications device configured for two-way communication (e.g., by radio wave 108 or other technology) between the central office server 102 and other elements of the water supply system 100, including water meters, water valves, water pressure sensors, water pumping sites, water reservoirs, etc.

In the example shown, the region 110 served by the water supply system 100 is divided by two boundaries 112, 114, to create three regions 116, 118, 120. In an example, regions or groups of customer sites may be defined based at least in part on water pressure, and techniques discussed herein assist to balance water pressure between the regions. While three regions are shown, in some examples much larger numbers (e.g., tens, hundreds, thousands, or more) of regions or groups may be defined. Accordingly, a number of such boundaries may be increased or decreased, as needed. Also, the location of the boundaries may be adjusted as needed. In an example, the boundaries may define groups of water meters and/or water-customer service-sites having shared characteristics. The characteristics may include a geographic elevation of a group of water service sites. The elevation may be an absolute elevation above sea level, or an elevation related to a (possibly changing) level of a reservoir of water. A second characteristic used to define groups of water meters and/or regions of water meters may include a water main or water mains that service a group of service sites. A third characteristic may include valve(s) that control flow to the group of service sites. A fourth characteristic may include a water pressure sensor that monitors pressure of water provided to the group of service sites. Additional characteristics may include a time of day, day of the week, or season of the year. The location of boundaries and the number of groups may be changed as customers are added, certain customers water lawns in certain seasons, hours of operation of businesses change during a day, season or year, etc.

In the example of FIG. 1, the regions 116, 118, 120 may be defined at least in part on their water pressure. Alternatively, or additionally, the regions may be defined at least in part on their need to have additional water supplies and/or their ability to provide such needed additional water supplies. In an example, one region may have water pressure that is lower than a specified or mandated value. Another region may have water pressure that is within an acceptable range of water pressures. Another region may have water pressure that is at the high end of such a range of water pressures. In such an example, water valves at customer sites having higher water pressure values may be adjusted to lessen water flow rates. Water valves at customer sites having lower water pressure values may be adjusted to increase water flow rates. The receipt of water pressure information obtained from sensors, and the generation and/or transmission of signals to valves (to increase or decrease flow restrictions) may be performed centrally (e.g., the central office server 102) or in a distributed manner by devices at locations (e.g., in association with valves, water pressure sensors, etc.) within the water supply system 100.

In an example, by adjusting valves in high pressure regions (e.g., region 120) to pass less water, and adjusting valves in low pressure regions (e.g., region 116) to pass more water, less variance and/or standard deviation in water pressure values measured throughout the system may be achieved. In many cases, a lower variance and/or standard deviation in water pressure values is a system goal. In a second example, a water system may be designed to prioritize higher water pressure and/or water supply to a particular area/region. In that case, valve adjustments may actually result in a greater standard deviation of water pressures across the system.

Figure 2:
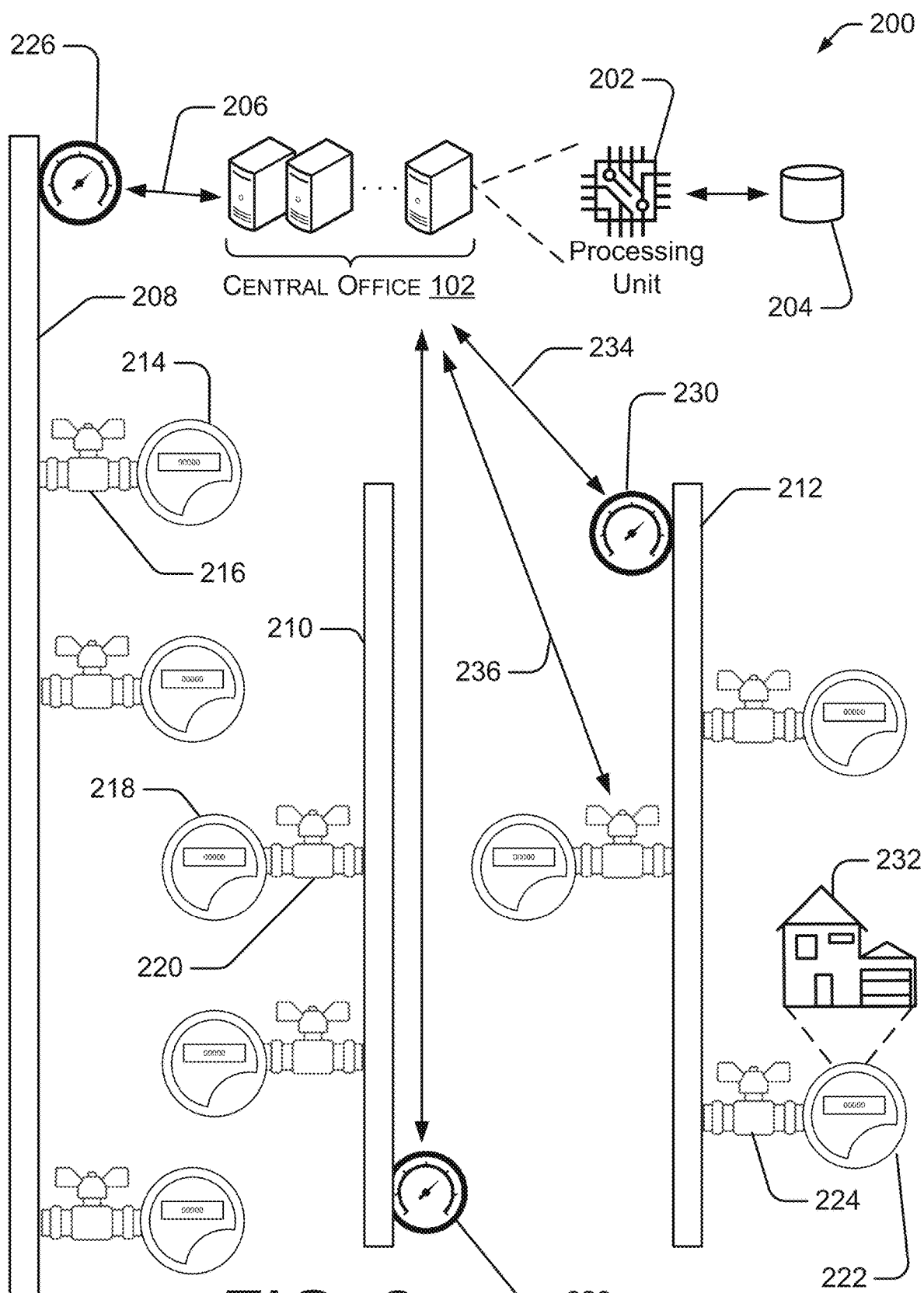
FIG. 2 is a block diagram showing an example water supply system, illustrating a central office server, three water mains, and a plurality of pressure sensors, valves and customer sites.

FIG. 2 shows an example water supply system 200, illustrating a central office server 102, having a processor 202 and memory device 204. The central office server may communicate over a network 206 with devices of the water supply system and/or any remote device. The network 206 may be the internet, a cellular network, a proprietary network, a hybrid or compound network, or any other network, as indicated by design requirements, availability, costs, etc.

In the example of water supply system 200, three water mains 208, 210, 212 each provide water to their respective customers at each customer's respective service site. In the example, water main 208 provides water to service sites including a service site having meter 214, which is associated with valve 216. Water main 210 provides water to service sites including a service site having meter 218, which is associated with valve 220. And, main 212 provides water to service sites including a service site having meter 222, which is associated with valve 224. In the example, each water main 208, 210, 212 may be associated with one or more pressure sensors. In the example shown, water mains 208, 210, 212 are associated with pressure sensors 226, 228, 230, respectively. While not shown for reasons of clarity, each water service site may include a customer 232, which may be a residence, business, organization, etc.

In the example of water supply system 200, the central office server 102 may communicate with pressure sensors and/or valves using radio waves 234, 236, or alternative technology. In the example, the central office server 102 may collect water pressure information from the water pressure sensors, and may send instructions to the valves that either increase or decrease the restriction of each respective valve.

In the example of water supply system 200, customers associated with one water main (e.g., water main 208) may have water pressure that is lower than a range of pressure values that is specified or mandated (e.g., below a first threshold value). Customers associated with another water main (e.g., water main 210) may have water pressure values that are toward the upper end of the range of water pressures (e.g., above a second threshold value). In such an example, water valves at customer sites having higher water pressure values may be adjusted to lessen water flow rates and/or valves at customer sites having lower water pressure values may be adjusted to increase water flow slightly. The receipt of water pressure information obtained from sensors, and the generation and/or transmission of signals to valves may be performed at the central office server 102 in a centralized manner.

Figure 3:
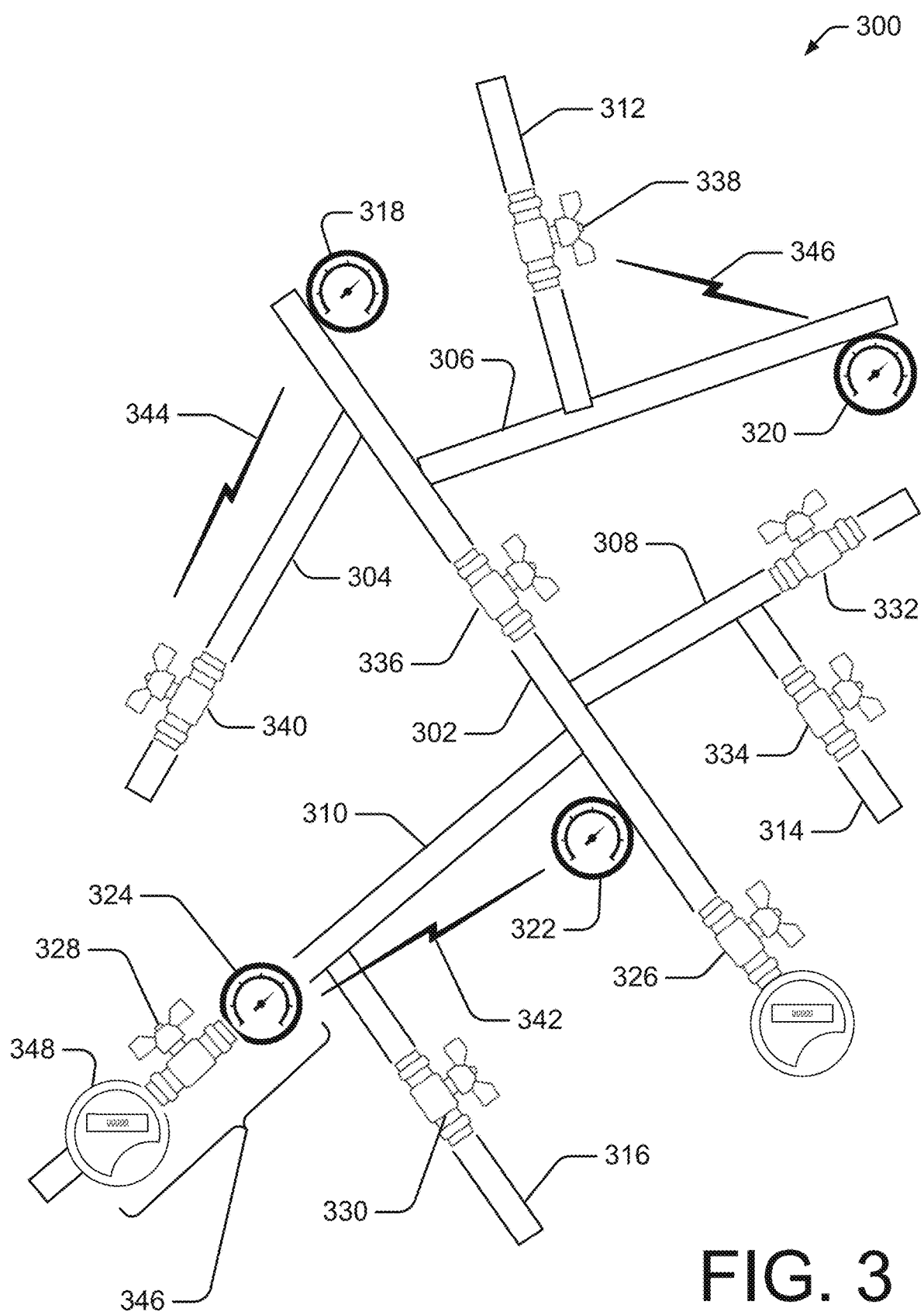
FIG. 3 is a block diagram showing an example water supply system, illustrating a relationship between water mains, pressure sensors and valves.

FIG. 3 shows an example water supply system 300 that illustrates a relationship between water mains, pressure sensors and valves. A major water main 302 provides water to four water mains 304, 306, 308, 310. Three minor water mains 312, 314, 316 receive water from the water mains 306, 308, 310, respectively. Three water pressure sensors 318, 320, 322 are associated with different locations within the water supply system 300. A fourth water pressure sensor 324 is associated with a customer site. Eight valves 326-340 may be used to turn water on or off throughout the system. Additionally, each valve can be adjusted slightly to decrease or increase a restriction of water flow. That is, each valve can be opened slightly wider or closed slightly narrower, to increase or decrease the flow of water at that valve's location. By opening a valve wider, pressure downstream of the valve may be increased. Conversely, by closing a valve somewhat, pressure downstream of the valve may be decreased.

In the example of water supply system 300, the valves and pressure sensors may communicate by radio or other technology. For clarity in the diagram, only radio links 342-344 are shown. However, a number of communication links (not shown) may be formed between many water pressure sensors, water valves, and control systems and associated circuitry. In the example shown, radio links 342, 344 are used to send commands from a sensor to a valve. The commands may direct the valve to open wider or close narrower, or may ask the valve its current state (e.g., 0% open to 100% open). Radio link 342 allows two pressure sensors to communicate. Knowledge of water pressure values at more locations can enable more effective control over a larger number of valves to move water from areas of higher pressure to areas of lower pressure.

In one example, a water meter 346 may include a metrology unit 348 to measure water usage, a valve 328 to control water passage to the customer, and a water pressure sensor 324. In a system including a large number of such water meters, narrowing the water valve when pressure exceeds a first threshold value, and widening the valve when the water pressure is less than a second threshold value (the first threshold value being larger than the second threshold value), will result in less variance in water pressure values throughout the water system. Accordingly, each water meter acts as an independent "group" of one customer site. In a further example, the water meter 346 could include a first water pressure sensor on an upstream side of the valve 328 and a second water pressure sensor on a downstream side of the valve. This would configure the customer site to adjust its valve based on comparing input and output pressure of the valve. In example operation, if the first water pressure sensor indicated generally high water-pressure, the valve could be adjusted so that the second water pressure sensor indicated pressure at an upper end of an acceptable range of water pressures. If the first water pressure sensor indicated generally lower water-pressure, the valve could be adjusted so that the second water pressure sensor indicated pressure at a lower end of the acceptable range of water pressures. Accordingly, the water meter 346 would provide higher water pressures to the customer when such pressures were available, but would divert water to other customers to a degree that was possible when water pressures were lower, while still keeping the customer within an acceptable range.

If the water meter 346 does not have a water pressure sensor, but receives water pressure information from a separate or somewhat remote water pressure sensor, similar benefits may be obtained. Accordingly, a group of water meters may be defined as those water meters receiving information from a same water pressure sensor.

In the example of water supply system 300, two or more groups may be defined. In an example, a group may be defined as a pressure sensor and valves downstream from that pressure sensor, which are not in the group of a pressure sensor that is further downstream. In a further example, a group may be defined as a pressure sensor and valves in the area of the pressure sensor. Such a group may function by restricting passage (i.e., partly closing) the valves of the group if the water pressure value measured by the pressure sensor is above a high threshold. The group may also function by lessening restriction of the valves of the group (i.e., more fully opening the valves) if the water pressure value as measured by the pressure sensor is below a low threshold. Accordingly, such a group could function even without knowledge of the topology of the water delivery system.

Figure 4:
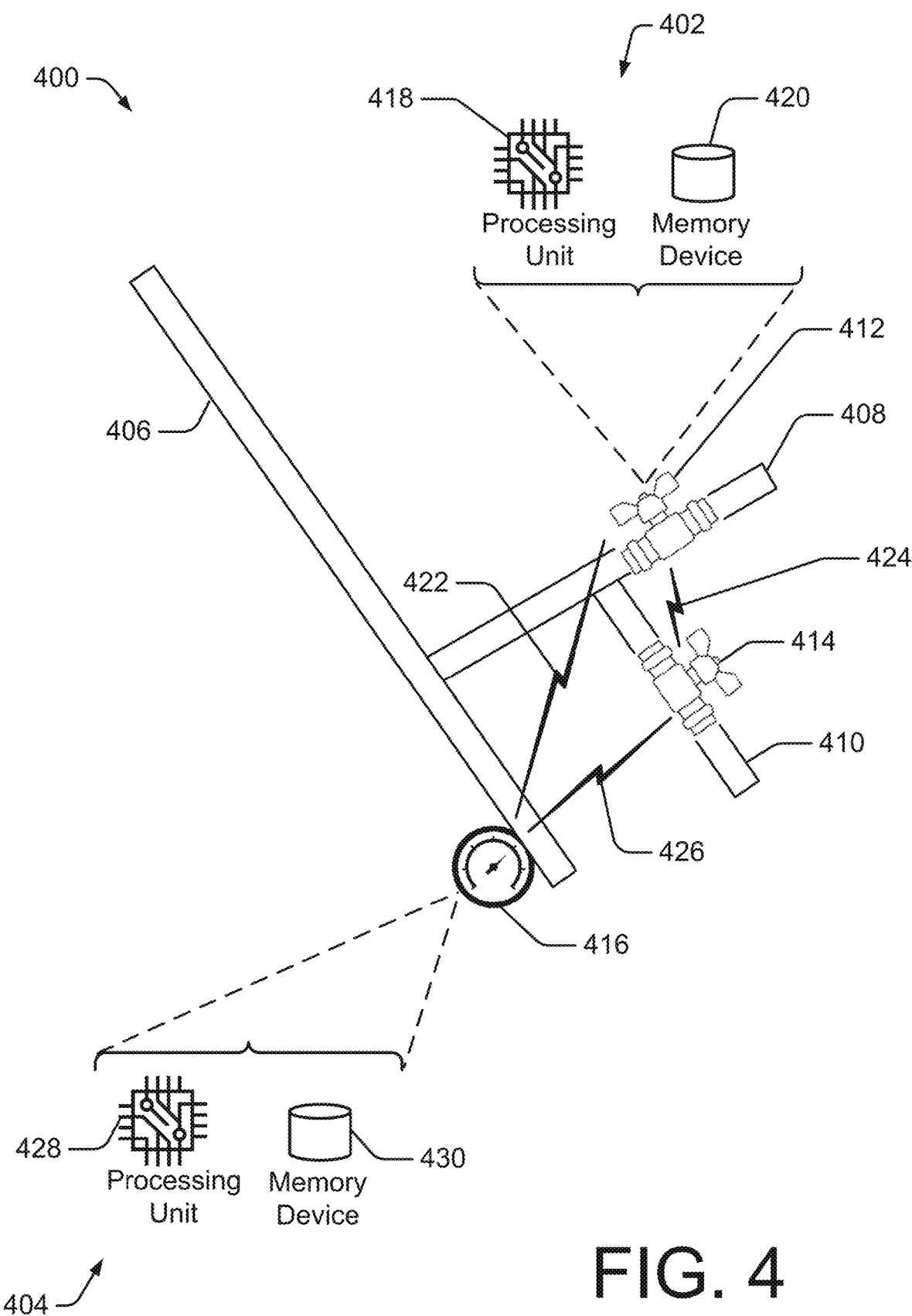
FIG. 4 is a block diagram showing an example water supply system, illustrating two example techniques for distributed processing of water pressure information and for valve and water pressure control.

FIG. 4 shows a portion of an example water supply system 400, and illustrates two example techniques for distributed processing of water pressure information and for valve and water pressure control. A distributed processing device 402 is associated with valve 412 and a processing device 404 is associated with pressure sensor 416.

The portion of the water supply system 400 includes three water mains 406, 408, 410. Two valves 412, 414 are shown. One or both valves may be associated with a customer water meter and service site. Such valves may be used to turn off water service to a customer site, such as in the event of nonpayment. Alternatively, one or both valves may be positioned on the water main to control water flow to a plurality of customers. Such valves may be used to turn off water to entire neighborhoods in the event of a major breakage, leak or other disaster. A water pressure sensor 416 is typically associated with a water main, but in some instances (e.g., for a large commercial consumer) may be part of a water meter of a single customer.

The distributed processing device 402 may be considered an "edge computing device," since such devices are on the "edge" of a network (or at least not at the network's center). In the example shown, a processor 418 is in communication with a memory device 420, which may include software to implement the techniques discussed herein, particularly with respect to FIGS. 7-11. In an example, the processor 418 may receive water pressure information, data and/or signal 422 from the water pressure sensor 416. The processor 418 may send a signal to more fully open or more fully close the valve 412. If the valve 414 is not associated with a dedicated processor, the processor 418 may send a similar signal 424 to valve 414.

The distributed processing device 404 may be associated with pressure sensor 416 and may include a processor 428 in communication with a memory device 430. The memory device 430 may include software to implement the techniques discussed herein, particularly in FIGS. 7-11. In an example (e.g., assuming distributed processing device 402 is not present), the processor 428 may receive water pressure information from the water pressure sensor 416. The processor 428 may send a signal 422 to more fully open or more fully close the valve 412 and/or a signal 426 to valve 414.

Example Time-Dependent and Time-Independent Water Pressure Issues

Figure 5:
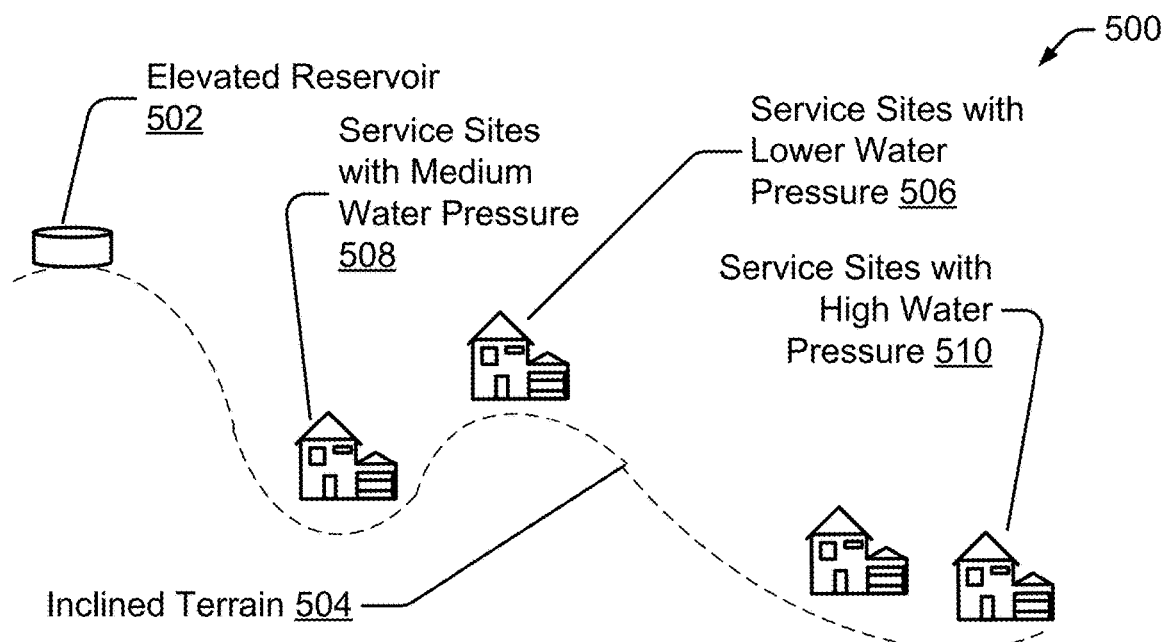
FIG. 5 is a diagram showing a geographic topology, and the impact of elevation on water pressure at customer sites.

FIG. 5 shows a geographic topology 500, and the impact of elevation on water pressure at customers' sites. A reservoir 502 is typically located in an elevated position. Because of the inclined terrain 504, some customer sites 506 have lower water pressure, other customer sites 508 have medium water pressure, and still other customer sites 510 have higher water pressure.

In an example, these three types of customers could be used to define three groups of customers, with valves regulating flow to the customers 506 being the most widely open, the valves regulating flow to customers 510 being the least widely open, and the valves regulating flow to customers 508 having openings that may be intermediate to the other two.

In a further example, the definition of groups of customer sites by vertical elevation could be replaced by defining customer sites based on time of day and/or season of the year and/or periodic/occasional water pressure checks. In an example, businesses may use more water during business hours, and at least some valves within the water system may need to be reset at the start and end of business hours. Similarly, houses may use more water during the summer yard sprinkling season, and valves may need to be reset at the beginning and end of summer. And further, routine water pressure checks may reveal an imbalance between water pressure values of customers in different geographic areas, and valves may need to be reset upon discovery of such imbalances.

Figure 6:
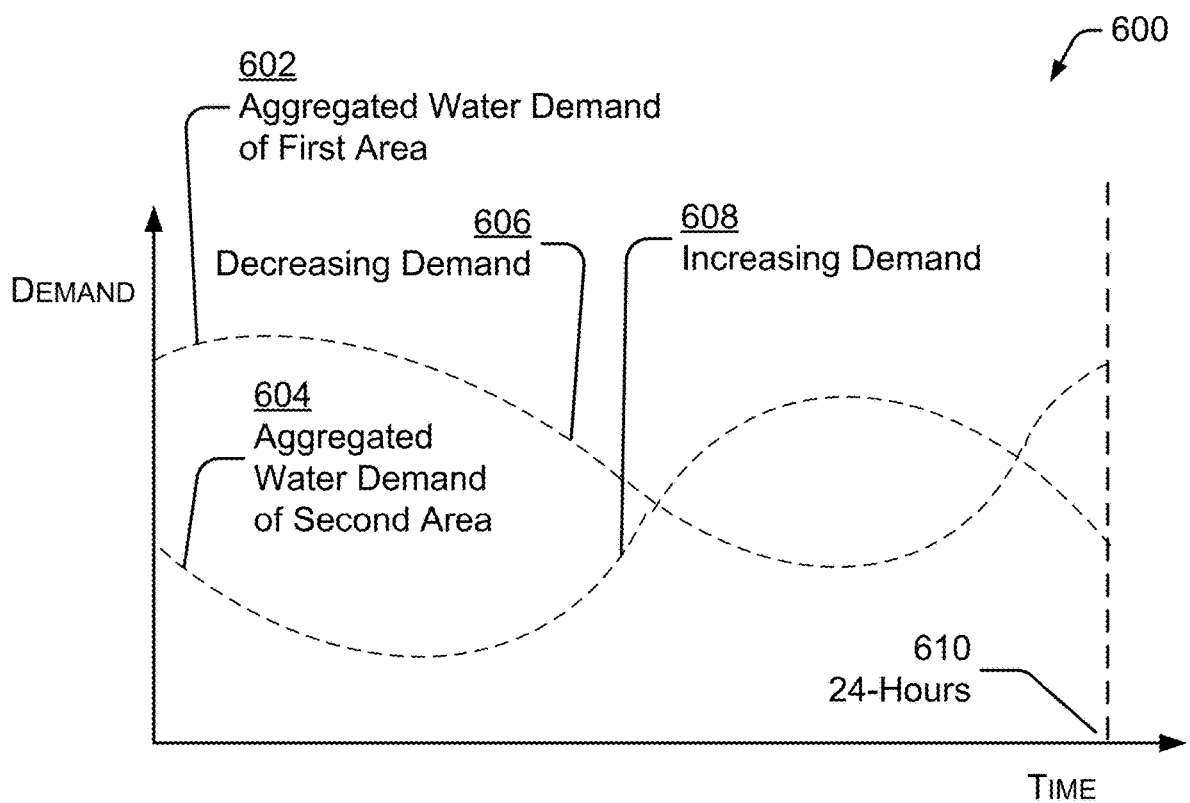
FIG. 6 is a graph showing a relationship between water demand and time for first and second areas within a water supply system.

FIG. 6 shows a relationship 600 between water demand and time for a first area 602 and a second area 604 within a water supply system. The relationship 600 includes periods of decreasing demand 606 (e.g., of the aggregated water demand in the first area 602). The relationship 600 also includes periods of increasing demand 608 (e.g., of the aggregated water demand in the second area 604).

Thus, while FIG. 5 showed a first factor (elevation) that influences water pressure within a water delivery system, FIG. 6 shows a second factor (time) that also influences water pressure within a water delivery system.

Because the aggregated demand for water in the two regions changes over time, FIG. 6 suggests (in view of the discussion herein) that valves within at least one of the two regions should be adjusted as aggregated demand is rising, and then again as aggregated demand is falling. If valves in only one of the areas are adjusted, the water pressure in both areas may benefit. However, the benefit of adjusting valves in both areas may be greater than the cost (e.g., the cost to use network bandwidth for sending instructions to the valves, etc.).

Example Methods

In some examples of the techniques discussed herein, the methods of operation may be performed by one or more application specific integrated circuits (ASIC) or may be performed by a general-purpose processor utilizing software defined in computer readable media. In the examples and techniques discussed herein, the memory 204, 420, 430 may comprise computer-readable media and may take the form of volatile memory, such as random-access memory (RANI) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 7:
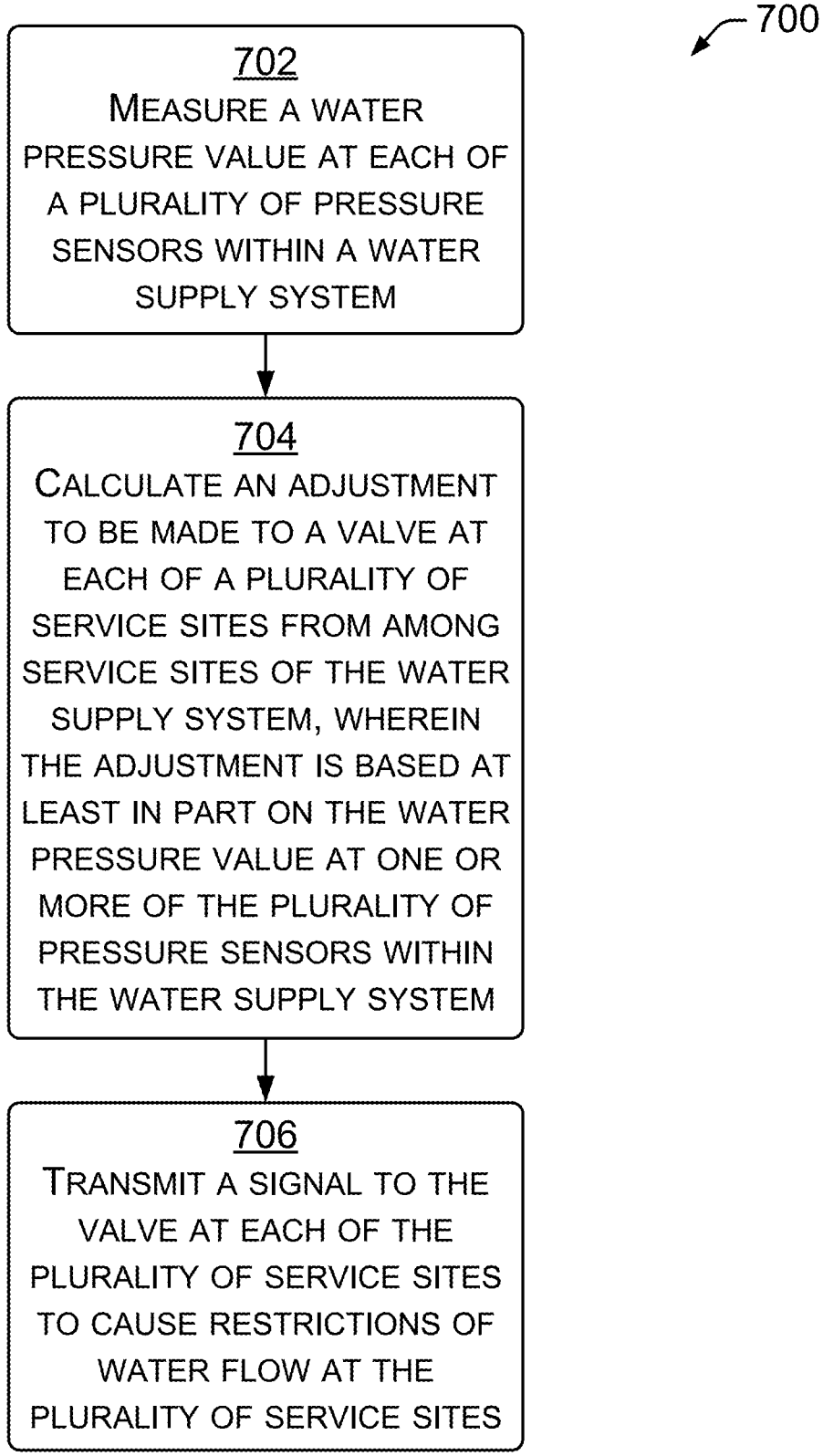
FIG. 7 is a flow diagram showing example operation of a water supply system, which measures water pressure at a plurality of locations, calculates adjustments to be made to a plurality of valves, and transmits signals to service sites to implement the valve adjustments.

FIG. 7 shows an example method 700 to operate aspects of a water system. The method 700 describes measuring water pressure at a plurality of locations, calculating adjustments to be made to a plurality of valves, and transmitting signals to water service sites having valves to implement the adjustments. In a first example, part of a water system (e.g., associated with all or part of a particular water main) may have measured water pressure that is below a threshold water pressure value. Accordingly, instructions are sent to valves associated with customer sites in that part of the water system to more fully open (e.g., to a maximum value). In a second example, a different part of the water system may determine that its water pressure is above a threshold water pressure value, and instruct valves associated with customer sites in that part of the water system to restrict their opening somewhat. A processor implementing the first example may or may not be in communication with a processor implementing the second example. In a third example, the measurements of water pressure may be received by a central processor, which calculates appropriate adjustments to a plurality of valves based on the received water pressure values, and transmits signals to appropriate valves according to the calculations.

In a first example of a method to determine if, when, and by how much to restrict or relax (open) valves, it may be assumed that the water delivery system starts with all valves fully open. In the course of operation, valves in the high-pressure areas are partially closed. This would divert water to, and raise pressure in, low water-pressure areas.

In a second example of a method, the starting position for most or all valves would be partially closed (e.g., each valve 75% open, 25% closed). Such a starting point allows the system to both open and close valves, to divert water from high-pressure areas to low-pressure areas. The starting point also allows valves to respond to feedback (by further opening or further closing) as the system moves to an equilibrium condition.

Accordingly, if a first region of customers in a water-supply system has higher water-pressure, and a second region has lower water pressure, the water system may perform at least one of: partially closing at least one valve controlling water flow to the first region; and partially opening at least one valve controlling water flow to the second region. In a more complex system, in addition to recognizing that one region has high-pressure and one region has low-pressure, water valves may be operated by a control system that may include one or more of a topology database mapping water sensors, water valves, customer sites, etc., and programming that may range from relatively simple configurations of IF-THEN statements to much more complex neural networks and/or artificial intelligence.

At block 702, a water pressure value is measured at each of a plurality of pressure sensors within a water supply system. In the example of FIG. 2, the sensors include water pressure sensors 226, 228 and 230, each associated with a different water main. In the example of FIG. 3, the sensors include water pressure sensors 318, 320 and 322, each associated with a different region in the water pressure system, and sensor 324 associated with a water meter 346. In the example of FIG. 4, water pressure sensor 416 is associated with a group of water valves including the illustrated valves 412, 414, which may represent additional valves in the group of valves.

At block 704, an adjustment calculated, to be made to a valve at each of a plurality of service sites from among service sites of the water supply system. In an example, the adjustment is based at least in part on the water pressure value at one or more of the plurality of pressure sensors within the water supply system. The adjustment may be made to one or more valves, depending on the layout (or topology) of the water supply system. A water system may include two areas (e.g., each area served by its own fork in a major water main). The amount of water going down each fork may be controlled at least in part by fully opening valves at each customer's site in the area associated with a first fork and by partially closing valves at each customer's site in the area associated with a second fork.

At block 706, a signal is transmitted to the valve at each of the plurality of service sites to increase or decrease restrictions of water flow at the plurality of service sites. The signals may be sent to valves at individual service sites, at locations along water mains, and/or other locations.

Figure 8A:
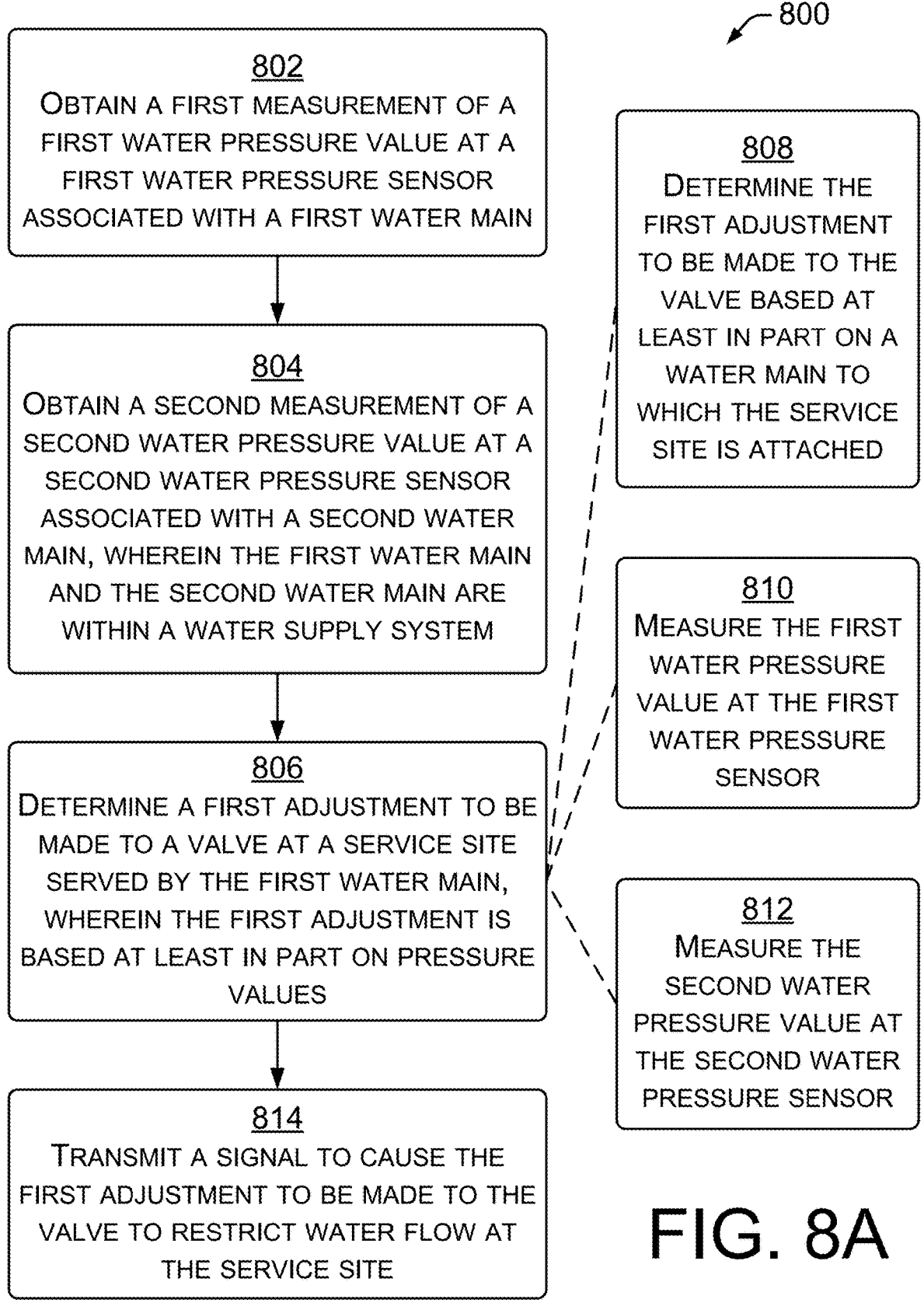
FIG. 8A is a flow diagram showing example operation of a water supply system, with FIG. 8B showing distributed processing techniques optionally used during the operation.
Figure 8B:
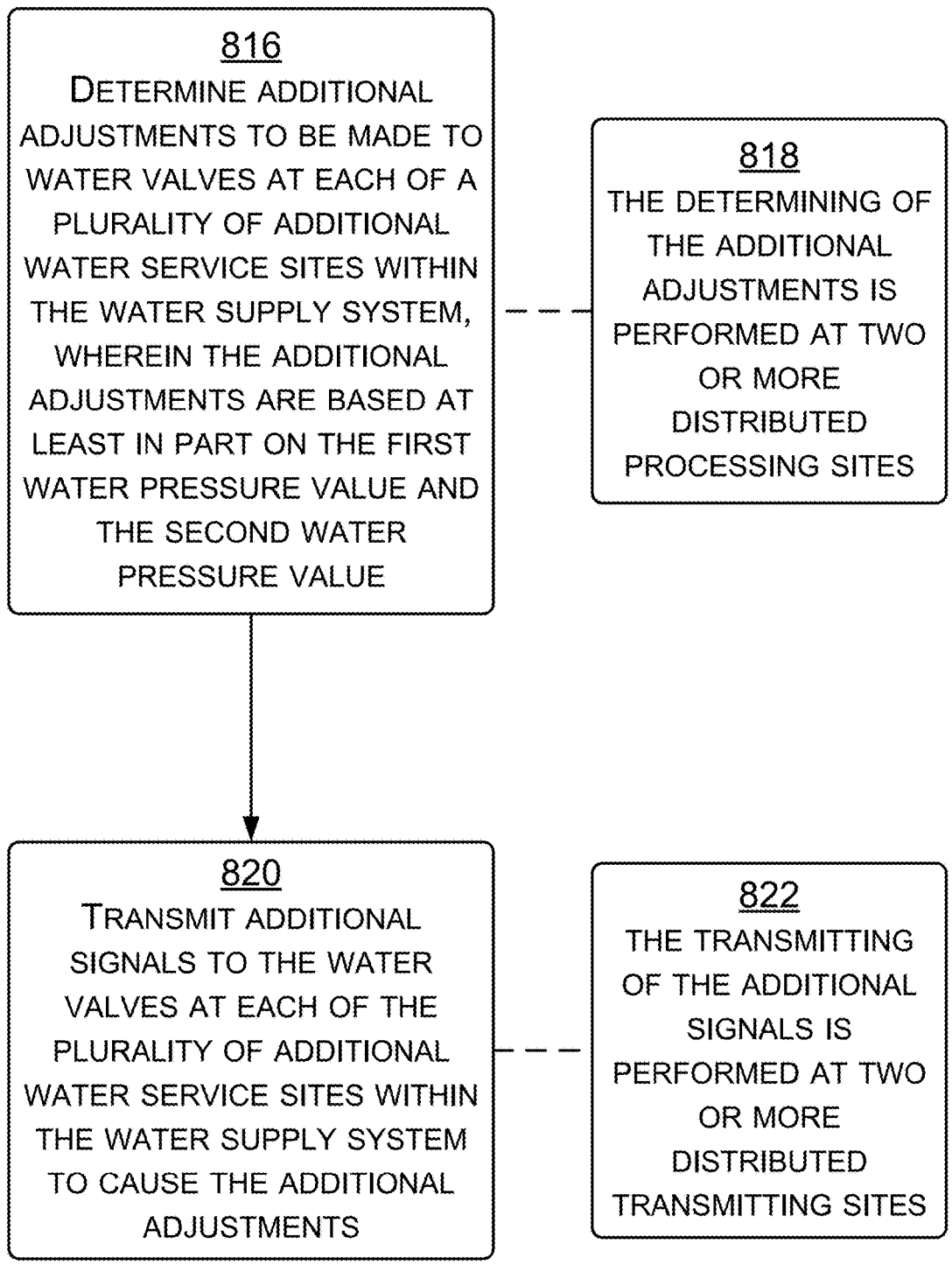

FIGS. 8A and 8B are flow diagrams showing a second example method 800 of operation of a water system. In one example of the techniques of FIG. 8A, water pressure values within two water mains may be obtained. In an example, the two water mains may be left and right forks of a major water main. If differences in water pressure within first and second water mains is detected, adjustments to valves associated with at least one water main may be determined. By transmitting appropriate signals to each of the valves, the aggregated water consumption of customers on one water main may be reduced and the aggregated water consumption of customers on the other water main may be increased. In an example, the signals may cause valves in the higher water pressure water main to close slightly. Appropriate adjustment of the water valves of the customers whose usage is reduced may prevent those customers from even noticing the change. The slight closures may divert water to the other water main, thereby providing customers served by that water main with more water and more water pressure.

At block 802, a first measurement of a first water pressure value at a first water pressure sensor associated with a first water main is obtained.

At block 804, a second measurement of a second water pressure value at a second water pressure sensor associated with a second water main is obtained. In an example, the first water main and the second water main are within the same water supply system.

At block 806, a first adjustment to be made to a valve at a service site served by the first water main is determined. In an example, the first adjustment is based at least in part on pressure values. In the example of block 808, the first adjustment to be made to the valve is determined. In the example, the determination is based at least in part on a water main to which the service site is attached. In the example of block 810, the first water pressure value is measured at the first water pressure sensor. In the example of block 812, the second water pressure value is measured at the second water pressure sensor. Accordingly, measurements made by different water pressure sensors may be used to determine regions of higher than threshold water pressure and regions of lower than threshold water pressure.

At block 814, a signal—to cause the first adjustment to be made to the valve to restrict water flow at the service site—is transmitted. In some examples, large numbers of signals are transmitted to a respective large number of valves. This may lower water usage in a region by a significant quantity. However, as a percentage of total aggregate flow, it may be low enough that customers do not notice the reduction.

FIG. 8B is a flow diagram showing an example extension of the operation of a water system described in FIG. 8A. In one example of the techniques of FIG. 8A, distributed processing techniques are used, and adjustments are determined and applied to a plurality of water valves. Example distributed techniques are described with respect to FIG. 8B.

At block 816, additional adjustments are determined. The adjustments may be in addition to the adjustment made at block 814, and may be made to water valves at each of a plurality of additional water service sites within the water supply system. The additional adjustments may be based at least in part on the first water pressure value and the second water pressure value.

At block 818, the determining of the additional adjustments is performed at two or more distributed processing sites. Referring to the example of FIG. 4, example distributed processing sites 402, 404 are shown. The distributed processing sites may operate in a coordinated manner that leverages the knowledge of activities of other processing site. Alternatively, the distributed processing sites may operate without coordination with other processing sites. In an example, processing sites in a high-pressure region may restrict valves and divert water. Similarly, processing sites in a low-pressure region may lessen valve restrictions in an effort to receive additional water and/or water pressure.

At block 820, additional signals may be transmitted to the water valves at each of the plurality of additional water service sites within the water supply system to cause the additional adjustments.

At block 822, the transmitting of the additional signals is performed at two or more distributed transmitting sites. FIG. 4 shows the operation of two distributed transmitting sites 402, 404.

Figure 9:
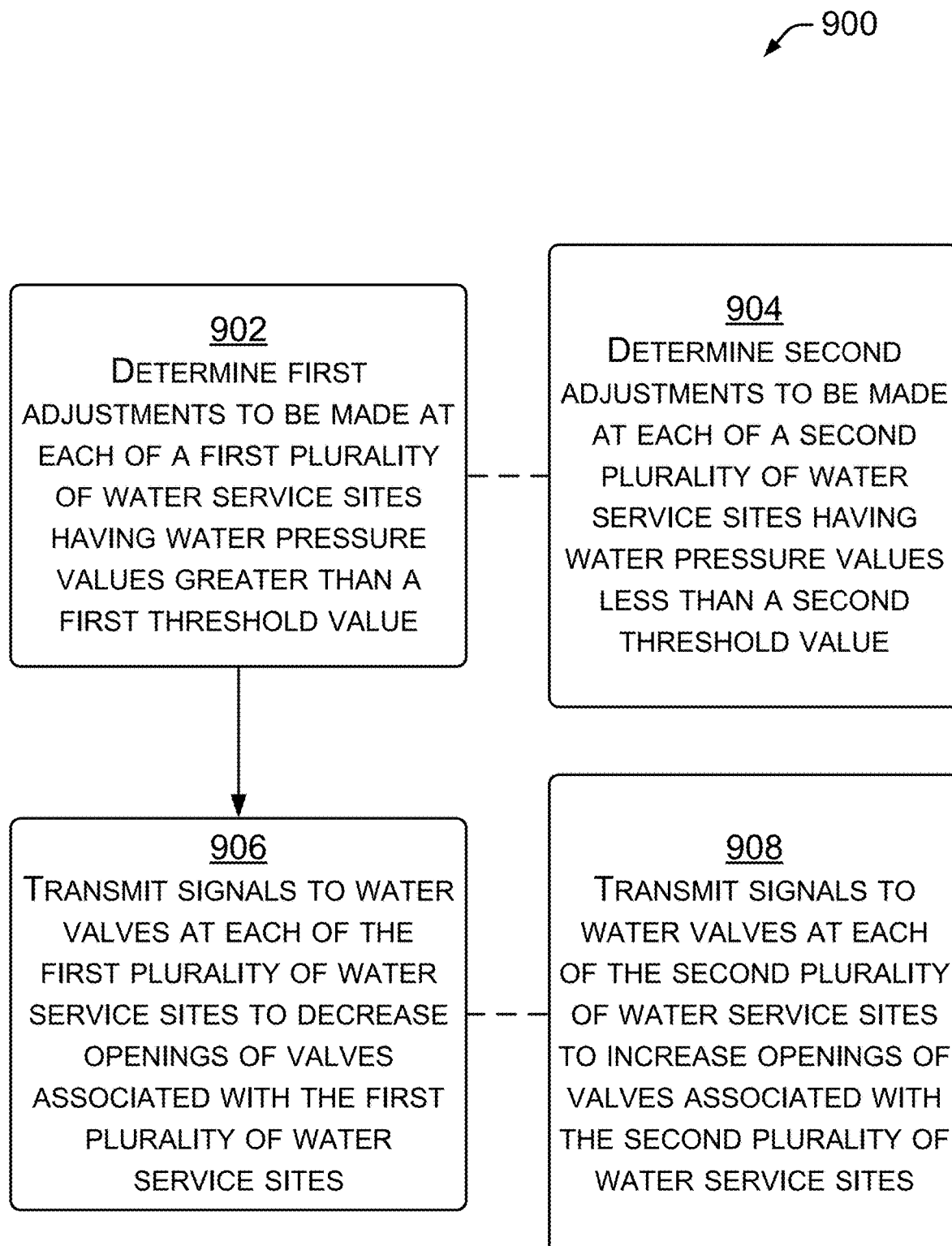
FIG. 9 is a flow diagram showing further example operation of a water supply system and showing techniques to compare threshold values to measured water pressures.

FIG. 9 shows a further example of a method 900 of operation of a water system, and techniques that compare threshold values to measured water pressures. The method 900 additionally describes how the comparisons may be used to identify valves that should be opened more and to identify valves that should be opened less.

The example of block 902 is related to the actions applied to higher-pressure water service sites. In the example, first adjustments are determined for each of a first plurality of water service sites having water pressure values greater than a first threshold value. Since the higher-pressure water service sites may be able to divert water to the lower-pressure water service sites, the adjustment may be to close their valves somewhat to divert water (e.g., a calculated or approximated quantity of water) to the lower-pressure service sites. The example of block 904 is related to the actions applied to lower-pressure water service sites. In the example, second adjustments are determined for each of a second plurality of water service sites having water pressure values less than a second threshold value. Since the lower-pressure water service sites need additional water and/or water pressure, the adjustment to these sites may be to increase valve openings or to fully open one or more of their valves. The example of block 904 may be unnecessary, if the valves of the second plurality of service sites are already fully open, or if the adjustments of block 902 diverted sufficient water to the lower-pressure service sites.

At block 906, signals are transmitted to water valves at each of the first plurality of water service sites to decrease openings of valves associated with the first plurality of water service sites. In the example of block 908, signals are transmitted to water valves at each of the second plurality of water service sites to increase openings of valves associated with the second plurality of water service sites.

Figure 10:
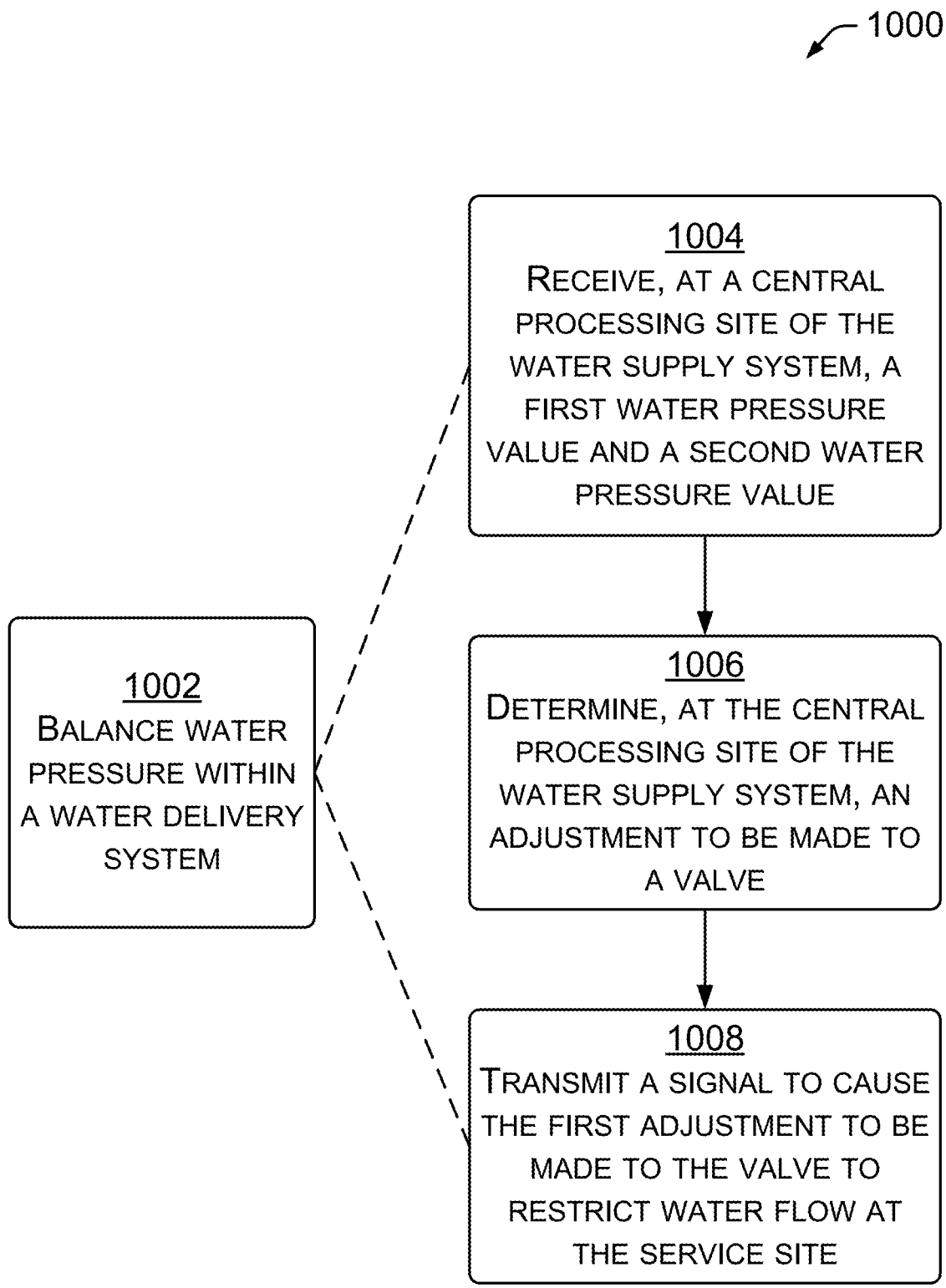
FIG. 10 is a flow diagram showing example operation of a water supply system using centralized processing techniques.

FIG. 10 shows an example method 1000 of operation of a water system using centralized processing techniques that tend to balance water pressure seen at customer water meters throughout the system. In an example, a centralized processor (e.g., the central office server 102 of FIGS. 1 and 2) receives water pressure values, determines valve adjustment, and transmits signals to valves to put the adjustments into effect.

At block 1002, water pressure is balanced (at least somewhat) within a water delivery system using central processing techniques. An example of central processing techniques is seen in FIG. 2. In an example, the variance and/or standard deviation of water pressure values at water customer sites is lessened by the techniques.

At block 1004, a first water pressure value and a second water pressure value are received at a central processing site of the water supply system. In an example, the first water pressure value is in an upper portion of a range of acceptable water pressures, while the second water pressure value is in a lower portion of a range of acceptable water pressures or is below the range.

At block 1006, an adjustment to be made to a valve within the water delivery system is determined at a central processing site of the water supply system.

At block 1008, a signal is transmitted to cause the first adjustment to be made to the valve to restrict water flow at the service site.

Figure 11:
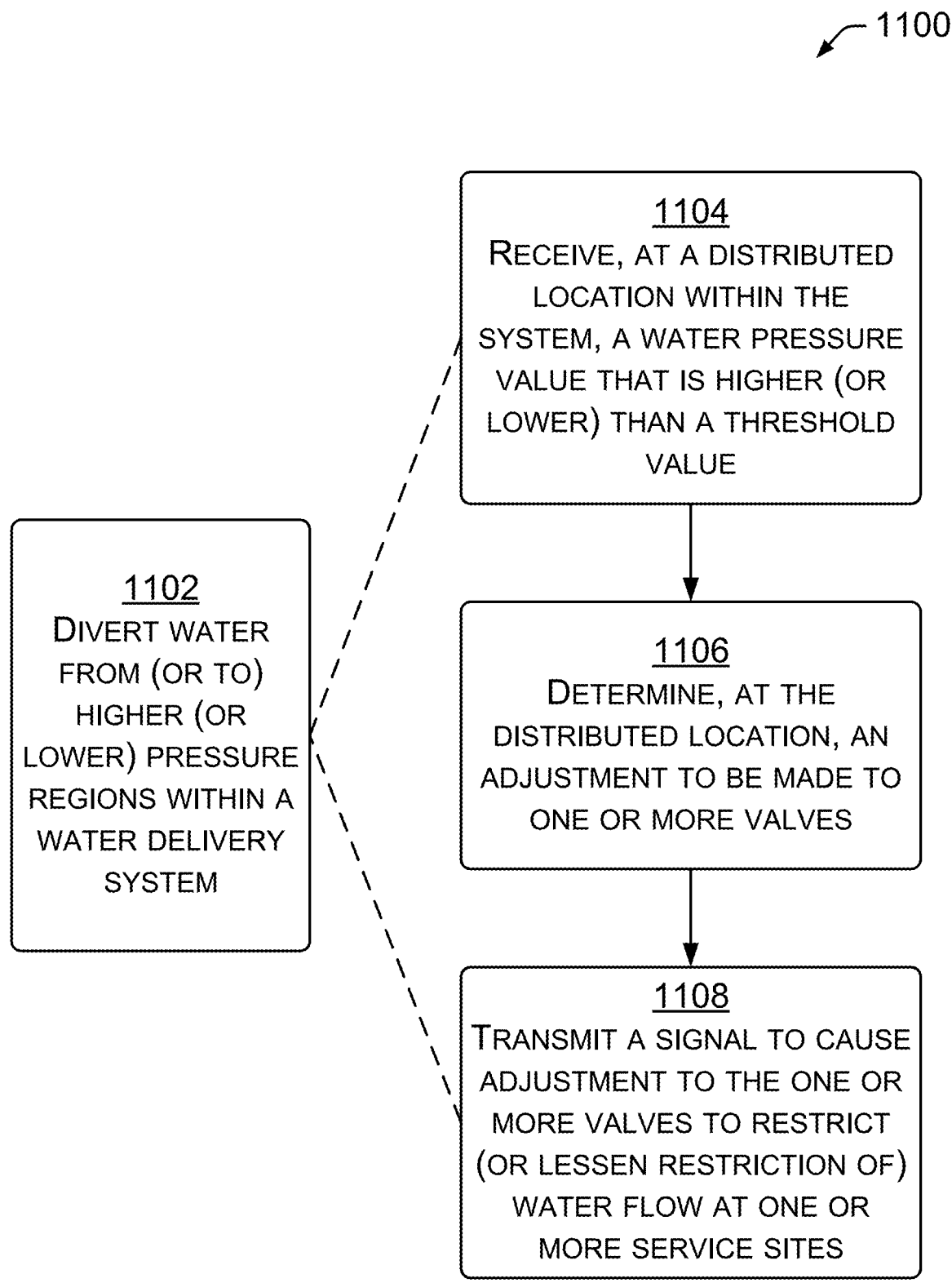
FIG. 11 is a flow diagram showing example operation of a water system using distributed processing techniques.

FIG. 11 shows an example method 1100 of operation of a water system using distributed processing techniques. An example of distributed processing techniques is seen in FIG. 4. The method 1100 shows how areas within a water supply system may use distributed processing to move water within the system to keep the areas within an acceptable range of water pressure or in order to prioritize water delivery to critical service points during times of water shortage.

At block 1102, water is diverted from higher pressure regions to lower pressure regions within a water delivery system using distributed processing.

At block 1104, a water pressure value that is higher (or lower) than a respective threshold value is received at a distributed location within the system.

At block 1106, at the distributed location, an appropriate adjustment is determined for application to one or more valves.

At block 1108, a signal is transmitted to cause adjustment to the one or more valves to restrict (or lessen restriction of) water flow at one or more service sites.

Example Systems and Devices

In an example of techniques for controlling water pressure at a plurality of water customer service sites, a first plurality of water service sites having water pressure values greater than a minimal target pressure are identified. A second plurality of water service sites having pressure values less than the minimal target pressure are identified. The pressure in a water distribution system differs from point to point due to pipe size differences, length of pipe run, and number of pipe bends. In an example, 20 psi is a minimal pressure, 30 psi-80 psi is a normal range or pressure, and 90 psi is maximum pressure value.

Valves controlling water flow to respective customer service sites within the first and second pluralities of water service sites are adjusted. The adjustment increases water pressure in the second plurality of water service sites to a pressure above the minimal target pressure. The adjustment maintains the water pressure of the first plurality of service sites above the minimal target pressure. Pressure is generally set higher upstream in the distribution system so that pressure downstream does not fall below a low threshold at service points.

In an example, groups of water service sites are associated with respective water mains and/or water pressure sensors. Information shared between groups may assist in adjusting water valves within the water system.

The pressure in some city water systems can vary up to 20 psi throughout the course of a day, due to increased water usage during peak usage hours (typically causing lower pressure) and/or decreased water usage during off-peak hours (typically causing higher pressure). This variability of pressure in the system can cause several problems, including: early pipe fatigue failure, especially at joints and bends; increased water loss at leak points if pressure is too high; increased complexity of hydraulic modeling of the system operation making predictions/outcomes more difficult; and loss of water availability at some system points prior to other system points.

In an example water system, water valves (e.g., for water disconnect and/or restriction) can be installed at service points (e.g. as a water meter with an integrated water valve). In addition to (or in place of) individual service point restriction, adjustments could occur in the larger distribution system gate valves that feed neighborhoods or irrigation areas. This would require fewer valves and infrastructure. Pressure readings can be retrieved from pressure sensors at key points in the distribution system. In an example, an algorithm partially restricts individual service point valves to balance out water pressure across the system. Restricted flow at a service point results in reduced pressure at that service point, but also results in an increase of available flow and pressure for other service points. The restrictions can be small enough (e.g., less than 5% and/or less than 5 psi) that the consumer at a single service point will not notice a difference. In an example of a high-pressure area, a water pressure reduction may be much larger. In the example, if the water pressure in an area is 90 psi, pressure may easily be reduced to approximately 70 psi—a reduction of 20 psi—without the customer noticing. However, when the valve restrictions are aggregated across many service points, the valve restrictions (i.e., partial valve closure) can result in larger system wide water pressure balancing. Thus, the utility company and many customers could benefit with no noticeable cost to the other consumers.

In an example, the analysis of the system pressure and control of the valves could be handled remotely by an application (e.g., software running at centralized or distributed locations).

As an alternative to sending the pressure data to a headend application, the analysis and decisions can be made via distributed intelligence or edge computing if the pressure sensing devices can communicate with the valve control devices. In some examples, the valve control devices may have some knowledge of the distribution topology. Thus, a valve may close somewhat if it has data indicating that one or more customer sites would benefit from the partial closure. In an example, valve control devices could be programmed to belong to a group based on their attachment to a distribution main or other regional grouping. The valve control devices in the group could be programmed to share and analyze the pressure data from pressure sensors in their group, and current valve restriction settings, and collectively decide which valves should be adjusted in order to balance the pressure in their portion of the system.

Such water systems have a number of advantages, such as: extension of pipe infrastructure life; reduction of water loss due to leaks in high pressure areas; reliability of water supply to service points in traditionally low-pressure areas; simplification of water system model to enable simpler and more accurate predictions of water demand, actual water use and water pressure.

The characteristics of such water systems include at least several general concepts. A first concept includes the algorithms, systems and/or logic to decide when and how much flow to restrict at which points in order to balance segments of the system both proactively and reactively. A second concept includes the sharing of information between meters/ valve devices and pressure sensors in a distributed intelligence or edge computing scenario.

In addition to balancing the system pressure, the same infrastructure, with adjustment to the controlling algorithms, can be used to prioritize water supply to critical service points during times of water shortage (i.e., to maintain an outcome of resource availability).

The following examples of granular control of water distribution system pressure are expressed as number clauses. While the examples illustrate a number of possible configurations and techniques, they are not meant to be an exhaustive listing of the systems, methods, and/or computer- or processor-readable media described herein.

1. A method, comprising: obtaining a first measurement of a first water pressure value at a first water pressure sensor associated a first water main; obtaining a second measurement of a second water pressure value at a second water pressure sensor associated with a second water main, wherein the first water main and the second water main are within a water supply system; determining a first adjustment to be made to a valve at a service site served by the first water main, wherein the first adjustment is based at least in part on pressure values comprising: the first water pressure value measured at the first water pressure sensor; and the second water pressure value measured at the second water pressure sensor; and transmitting a signal to cause the first adjustment to be made to the valve to restrict water flow at the service site.

2. The method of clause 1, additionally comprising: determining a second adjustment to be made to a second valve at a second service site within the water supply system, wherein the second adjustment is based at least in part on the first water pressure value and the second water pressure value; and transmitting a second signal to cause the second adjustment to be made to the second valve to lessen a restriction to water flow at the second service site.

3. The method of clause 1 or any preceding clause, additionally comprising: determining additional adjustments to be made to water valves at each of a plurality of additional water service sites within the water supply system, wherein the additional adjustments are based at least in part on the first water pressure value and the second water pressure value; and transmitting additional signals to the water valves at each of the plurality of additional water service sites within the water supply system to cause the additional adjustments.

4. The method of clause 3, wherein: the determining of the additional adjustments is performed at two or more distributed processing sites; and the transmitting of the additional signals is performed at two or more distributed transmitting sites.

5. The method of clause 1 or any preceding clause, wherein: the determining comprises determining first adjustments to be made at each of a first plurality of water service sites having water pressure values greater than a first threshold value; and the transmitting comprises transmitting signals to water valves at each of the first plurality of water service sites to decrease openings of valves associated with the first plurality of water service sites.

6. The method of clause 5, wherein: the determining additionally comprises determining second adjustments to be made at each of a second plurality of water service sites having water pressure values less than a second threshold value; and the transmitting additionally comprises transmitting signals to water valves at each of the second plurality of water service sites to increase openings of valves associated with the second plurality of water service sites.

7. The method of clause 1 or any preceding clause, wherein determining the first adjustment to be made to the valve is based at least in part on a water main to which the service site is attached.

8. The method of clause 1 or any preceding clause, wherein the first adjustment reduces the first water pressure value by less than 5 pounds per square inch.

9. The method of clause 1 or any preceding clause, wherein: a first group comprises: a first plurality of valves, including the valve at the service site, associated with a first plurality of service sites, respectively; and the first water pressure sensor; a second group comprises: a second plurality of valves associated with a second plurality of service sites, respectively; and the second water pressure sensor; and wherein the method additionally comprises: transmitting first signals to the first plurality of valves to restrict water flow; and transmitting second signals to the second plurality of valves to lessen restriction of water flow.

10. The method of clause 1 or any preceding clause, additionally comprising: receiving, at a central processing site of the water supply system, the first water pressure value and the second water pressure value; and determining, at the central processing site of the water supply system, the first adjustment to be made to the valve.

11. A water supply system, comprising: a first group of devices comprising: a first water pressure sensor; and a first valve; a second group of devices comprising: a second water pressure sensor; and a second valve; and a processor, configured to perform operations comprising: determining that a first water pressure value obtained from the first water pressure sensor is greater than a first threshold value; determining that a second water pressure value obtained from the second water pressure sensor is less than a second threshold value; and adjusting the first valve to decrease water flow.

12. The water supply system as recited in clause 11, wherein the processor is configured to perform further operations comprising: adjusting the second valve to increase water flow.

13. The water supply system as recited in clause 11 or any preceding clause, wherein: the first valve controls flow to a first customer site; the second valve controls water flow to a second customer site; the first water pressure sensor measures water pressure within a first water main serving the first customer site; and the second water pressure sensor measures water pressure within a second water main serving the second customer site.

14. The water supply system as recited in clause 11 or any preceding clause, wherein the processor is configured to perform further operations comprising: determining which valve within the water supply system to restrict to divert water to the second valve.

15. The water supply system as recited in clause 11 or any preceding clause, wherein the processor is configured to perform further operations comprising: determining which valves within the water supply system to increase restriction and which valves to decrease restriction to result in a decrease in a standard deviation in water pressure values at all valves in the water supply system.

16. One or more computer-readable media storing computer-executable instructions that, when executed by one or more processors, configure a computing device to perform acts comprising: measuring a water pressure value at each of a plurality of pressure sensors within a water supply system; calculating an adjustment to be made to a valve at each of a plurality of service sites from among service sites of the water supply system, wherein the adjustment is based at least in part on the water pressure value at one or more of the plurality of pressure sensors within the water supply system; and transmitting a signal to the valve at each of the plurality of service sites to cause restrictions of water flow at the plurality of service sites.

17. One or more computer-readable media as recited in clause 16, wherein the calculating is performed at a central processing site of the water supply system.

18. One or more computer-readable media as recited in clause 16 or any preceding clause, wherein the calculating is performed at a plurality of distributed processing sites within the water supply system.

19. One or more computer-readable media as recited in clause 16 or any preceding clause, wherein the acts further comprise: responsive to water pressure within an appropriate range of water pressures as measured at the plurality of pressure sensors, resetting the valve at each of the plurality of service sites to a standard setting.

20. One or more computer-readable media as recited in clause 16 or any preceding clause, wherein the acts further comprise: calculating a second adjustment to be made to a valve at each of a second plurality of service sites from among service sites within the water supply system, wherein the second adjustment is based at least in part on the water pressure value at one or more of a second plurality of pressure sensors within the water supply system; and adjusting the valve at each of the second plurality of service sites according to the calculating, wherein the adjusting increases water flow at the plurality of service sites.

21. A method, comprising: identifying a first plurality of water service sites having water pressure values greater than a minimal target pressure; identifying a second plurality of water service sites having pressure values less than the minimal target pressure; and adjusting valves associated with the first and second pluralities of water service sites to increase water pressure in the second plurality of water service sites to a pressure above the minimal target pressure, while keeping the water pressure of the first plurality of service sites above the minimal target pressure.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
    obtaining a first measurement of a first water pressure value at a first water pressure sensor associated with a first water main;
    obtaining a second measurement of a second water pressure value at a second water pressure sensor associated with a second water main, wherein the first water main and the second water main are within a water supply system;
    determining which valves within the water supply system to increase restriction and which valves to decrease restriction to result in a decrease in a standard deviation in water pressure values at respective service sites in the water supply system, wherein for a valve at a service site served by the first water main the determining comprises:
        determining a first adjustment to be made to the valve at the service site served by the first water main, wherein the first adjustment is based at least in part on pressure values comprising:
            the first water pressure value measured at the first water pressure sensor; and
            the second water pressure value measured at the second water pressure sensor; and
        transmitting a signal to cause the first adjustment to be made to the valve to restrict water flow at the service site.

2. The method of claim 1, additionally comprising:
    determining a second adjustment to be made to a second valve at a second service site within the water supply system, wherein the second adjustment is based at least in part on the first water pressure value and the second water pressure value; and
    transmitting a second signal to cause the second adjustment to be made to the second valve to lessen a restriction to water flow at the second service site.

3. The method of claim 1, additionally comprising:
    determining additional adjustments to be made to water valves at each of a plurality of additional water service sites within the water supply system, wherein the additional adjustments are based at least in part on the first water pressure value and the second water pressure value; and
    transmitting additional signals to the water valves at each of the plurality of additional water service sites within the water supply system to cause the additional adjustments.

4. The method of claim 3, wherein:
    the determining of the additional adjustments is performed at two or more distributed processing sites; and
    the transmitting of the additional signals is performed at two or more distributed transmitting sites.

5. The method of claim 1, wherein:
    the determining comprises determining first adjustments to be made at each of a first plurality of water service sites having water pressure values greater than a first threshold value; and
    the transmitting comprises transmitting signals to water valves at each of the first plurality of water service sites to decrease openings of valves associated with the first plurality of water service sites.

6. The method of claim 5, wherein:
    the determining additionally comprises determining second adjustments to be made at each of a second plurality of water service sites having water pressure values less than a second threshold value; and
    the transmitting additionally comprises transmitting signals to water valves at each of the second plurality of water service sites to increase openings of valves associated with the second plurality of water service sites.

7. The method of claim 1, wherein the first adjustment reduces the first water pressure value by less than 5 pounds per square inch.

8. The method of claim 1, wherein:
    a first group comprises:
        a first plurality of valves, including the valve at the service site, associated with a first plurality of service sites, respectively; and
        the first water pressure sensor;
    a second group comprises:
        a second plurality of valves associated with a second plurality of service sites, respectively; and the second water pressure sensor; and
wherein the method additionally comprises:
transmitting first signals to the first plurality of valves to restrict water flow; and
transmitting second signals to the second plurality of valves to lessen restriction of water flow.

9. The method of claim 1, additionally comprising:
receiving, at a central processing site of the water supply system, the first water pressure value and the second water pressure value; and
determining, at the central processing site of the water supply system, the first adjustment to be made to the valve.

10. A water supply system, comprising:
a first group of devices comprising:
a first water pressure sensor; and
a first valve;
a second group of devices comprising:
a second water pressure sensor; and
a second valve; and
one or more processors, configured to perform operations comprising:
determining which valves within the water supply system to increase restriction and which valves to decrease restriction to result in a decrease in a standard deviation in water pressure values at respective service sites in the water supply system, wherein for the first valve the determining comprises:
determining that a first water pressure value obtained from the first water pressure sensor is greater than a first threshold value;
determining that a second water pressure value obtained from the second water pressure sensor is less than a second threshold value; and
adjusting the first valve to decrease water flow.

11. The water supply system as recited in claim 10, wherein the one or more processors are configured to perform further operations comprising:
adjusting the second valve to increase water flow.

12. The water supply system as recited in claim 10, wherein:
the first valve controls water flow to a first customer site;
the second valve controls water flow to a second customer site;
the first water pressure sensor measures water pressure within a first water main serving the first customer site; and
the second water pressure sensor measures water pressure within a second water main serving the second customer site.

13. The water supply system as recited in claim 10, wherein the one or more processors are configured to perform further operations comprising:
determining which valve within the water supply system to restrict to divert water to the second valve.

14. One or more computer-readable media storing computer-executable instructions that, when executed by one or more processors, configure a computing device to perform acts comprising:
measuring a water pressure value at each of a plurality of pressure sensors within a water supply system;
calculating an adjustment to be made to a valve at each of a plurality of service sites from among service sites of the water supply system, wherein the adjustment is based at least in part on the water pressure value at one or more of the plurality of pressure sensors within the water supply system and wherein the adjustment made to the valve at each of the plurality of service sites results in a decrease in a standard deviation in water pressure values at respective service sites within the water supply system; and
transmitting a signal to the valve at each of the plurality of service sites to adjust restrictions of water flow at each of the plurality of service sites.

15. One or more computer-readable media as recited in claim 14, wherein the calculating is performed at a central processing site of the water supply system.

16. One or more computer-readable media as recited in claim 14, wherein the calculating is performed at a plurality of distributed processing sites within the water supply system.

17. One or more computer-readable media as recited in claim 14, wherein the acts further comprise:
responsive to water pressure within an appropriate range of water pressures as measured at the plurality of pressure sensors, resetting the valve at each of the plurality of service sites to a standard setting.

18. One or more computer-readable media as recited in claim 14, wherein the acts further comprise:
calculating a second adjustment to be made to a valve at each of a second plurality of service sites from among service sites within the water supply system, wherein the second adjustment is based at least in part on the water pressure value at one or more of a second plurality of pressure sensors within the water supply system; and
adjusting the valve at each of the second plurality of service sites according to the calculating, wherein the adjusting increases water flow at the plurality of service sites.

19. The method of claim 1, wherein determining which valves within the water supply system comprises:
determining which valves regulating water flow within water mains.

20. The water supply system as recited in claim 10, wherein determining which valves within the water supply system comprises:
determining which valves regulating water flow to individual customers.

* * * * *